(12) United States Patent
Nam et al.

(10) Patent No.: US 9,247,376 B2
(45) Date of Patent: Jan. 26, 2016

(54) METHOD OF RECOMMENDING APPLICATION, MOBILE TERMINAL USING THE METHOD, AND COMMUNICATION SYSTEM USING THE METHOD

(75) Inventors: Ji-in Nam, Seoul (KR); Moon-sang Lee, Yongin-si (KR); Min-soo Koo, Seoul (KR); Seung-hyun Yoon, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 845 days.

(21) Appl. No.: 13/444,356

(22) Filed: Apr. 11, 2012

(65) Prior Publication Data
US 2012/0258696 A1 Oct. 11, 2012

(30) Foreign Application Priority Data
Apr. 11, 2011 (KR) .................. 10-2011-0033378

(51) Int. Cl.
*H04M 3/42* (2006.01)
*H04W 4/02* (2009.01)
*H04W 4/00* (2009.01)
*H04L 29/08* (2006.01)

(52) U.S. Cl.
CPC .............. *H04W 4/02* (2013.01); *H04L 67/22* (2013.01); *H04W 4/001* (2013.01)

(58) Field of Classification Search
CPC .............. G06Q 50/01; G06Q 30/0201; G06Q 30/0241; G06Q 30/0251; G06Q 30/0631; G06Q 30/0269; G06Q 20/3278; G06Q 30/0261; G06Q 30/0257; G06Q 30/0267; G06F 17/30241; G06F 17/30867; G06F 17/3087; G06F 17/30; H04L 67/22; H04W 4/001; H04W 4/02; H04W 4/023; H04W 4/021; H04W 64/00; H04W 4/027; H04W 4/18; H04W 52/0258
USPC ................ 455/414.2, 414.1, 404.2, 405, 419, 455/456.1; 370/328, 329, 330, 331; 714/4.1
See application file for complete search history.

(56) References Cited

U.S. PATENT DOCUMENTS

| | | | | |
|---|---|---|---|---|
| 2003/0182117 | A1* | 9/2003 | Monchi et al. | 704/237 |
| 2005/0235094 | A1* | 10/2005 | Sawada | 711/1 |
| 2008/0091970 | A1* | 4/2008 | Hanai et al. | 714/4 |
| 2009/0156182 | A1* | 6/2009 | Jenkins et al. | 455/414.2 |
| 2014/0351748 | A1* | 11/2014 | Xia et al. | 715/798 |

FOREIGN PATENT DOCUMENTS

KR 100699157 B1 3/2007

* cited by examiner

*Primary Examiner* — Nimesh Patel
(74) *Attorney, Agent, or Firm* — Sughrue Mion, PLLC

(57) ABSTRACT

A method of recommending an application, which is capable of selecting and recommending an application with a high possibility of use, the method including: receiving, in a server, frequencies of use of a plurality of applications that are classified according to a time when each application is executed or a location where each application is executed; selecting an application from among the plurality of applications based on time and location information of where a mobile terminal is located and the frequency of use of the application; and transmitting application recommendation information including the selected application from the server to the mobile terminal.

15 Claims, 7 Drawing Sheets

FIG. 5

| TIME / App. | SUNDAY | | | | | MONDAY | | | |
|---|---|---|---|---|---|---|---|---|---|
| | ... | 17 O'CLOCK | 18 O'CLOCK | 19 O'CLOCK | ... | ... | 17 O'CLOCK | 18 O'CLOCK | 19 O'CLOCK | ... |
| App. 1 | ... | 100 | 500 | 350 | ... | ... | 70 | 300 | 200 | ... |
| App. 2 | ... | 300 | 1000 | 800 | ... | ... | 200 | 800 | 600 | ... |
| ⋮ | ⋮ | ⋮ | ⋮ | ⋮ | ⋮ | ⋮ | ⋮ | ⋮ | ⋮ | ⋮ |

FIG. 6

| LOCATION / App. | LOCATION 1 | LOCATION 2 | LOCATION 3 | ..... |
|---|---|---|---|---|
| App. 1 | 500 | 300 | 220 | ..... |
| App. 2 | 1000 | 700 | 160 | ..... |
| ⋮ | ⋮ | ⋮ | ⋮ | ⋮ |

FIG. 7

| TIME AND SPACE \ App. | LOCATION 1 | | | | | | LOCATION 2 | | | | | |
|---|---|---|---|---|---|---|---|---|---|---|---|---|
| | SUNDAY | | | ... | MONDAY | | | ... | ... | ... | ... | ... |
| | 17 O'CLOCK | 18 O'CLOCK | ... | ... | 17 O'CLOCK | 18 O'CLOCK | ... | ... | ... | ... | ... | ... |
| App. 1 | 50 | 30 | ... | ... | 22 | 40 | ... | ... | ... | ... | ... | ... |
| App. 2 | 100 | 70 | ... | ... | 16 | 20 | ... | ... | ... | ... | ... | ... |
| App. 3 | 210 | 200 | ... | ... | 205 | 208 | ... | ... | 200 | 214 | ... | ... |
| ... | ...... | ...... | ...... | ...... | ...... | ...... | ...... | ...... | ...... | ...... | ...... | ...... |

710 (17 O'CLOCK / 18 O'CLOCK)
700
720

METHOD OF RECOMMENDING APPLICATION, MOBILE TERMINAL USING THE METHOD, AND COMMUNICATION SYSTEM USING THE METHOD

CROSS-REFERENCE TO RELATED PATENT APPLICATION

This application claims priority from Korean Patent Application No. 10-2011-0033378, field on Apr. 11, 2011, in the Korean Intellectual Property Office, the disclosure of which is incorporated herein in its entirety by reference.

BACKGROUND

1. Field

The exemplary embodiments relate to a method of recommending an application, a mobile terminal using the method, and a communication system using the method, and more particularly, to a method of recommending an application, which is executable in a mobile terminal, to a user, a mobile terminal using the method, and a communication system using the method.

2. Description of the Related Art

Recently, adoption of mobile terminals such as smart phones, personal digital assistants (PDAs), tablet personal computers, and pad type terminals has been rapidly expanding. Development of applications that are executable in the mobile terminals is also increasing rapidly to keep up with the rapid expansion of mobile terminals, and as a result, a great number of applications have been released.

Users of the mobile terminals need to search and select a desired application from among a great number of applications. As the number of applications to be searched increases, more time and effort is required to search for and select a predetermined application, which brings about inconvenience in using the mobile terminals.

Thus, there is a need to provide a method of recommending an application coinciding with an intention of a user to minimize a time that is required to search for the application, and to provide an apparatus using the method.

SUMMARY

The exemplary embodiments provide a method of recommending an application, which is capable of selecting and recommending an application with a high possibility of use, a mobile terminal using the method, and a communication system using the method.

The exemplary embodiments also provide a method of recommending an application, which enables users to rapidly and conveniently use applications, a mobile terminal using the method, and a communication system using the method.

According to an aspect of an exemplary embodiment, a method of recommending an application includes: receiving, in a server, frequencies of use of a plurality of applications that are classified according to a time when each application is executed or a location where each application is executed; selecting an application from among the plurality of applications based on time and location information of a mobile terminal and the frequency of use of the application; and transmitting application recommendation information including the selected application from the server to the mobile terminal.

The time and location information may include at least one of time information and location information about where the mobile terminal is currently located.

The receiving of the frequencies of use may include obtaining the frequency of use of each of the plurality of applications executable by the mobile terminal.

The method may further include, when executing a predetermined application in the mobile terminal, receiving at least one of time information and location information about the mobile terminal and information about the executed predetermined application to the server.

The receiving of the frequencies of use may include receiving a frequency of use of each of the plurality of applications, wherein the frequency of use of each application is classified by at least one from among season, month, day of the week, and hour when each application is executed.

The receiving of the frequencies of use may include receiving a frequency of use of each of the plurality of applications that is classified by a location of the mobile terminal which executes the application.

The selecting of the at least one application may include filtering an application which has a frequency of use that is independent of a time when the mobile terminal is used and a location where the mobile terminal is located.

The selecting of the at least one application may include selecting the at least one application from among the plurality of applications that do not include the filtered application.

The method may further include displaying a user interface including the application recommendation information on the mobile terminal.

The selecting of the at least one application may include selecting at least one application based on the time and location information and the frequency of use of each application accumulated for a predetermined period.

The selecting of the at least one application may include ranking the plurality of applications in order from highest to lowest frequency of use; and selecting the at least one application which corresponds to the time and location information of the mobile terminal and which has a frequency of use that is within a predetermined ranking of the ranked plurality of applications.

According to another aspect of an exemplary embodiment, a mobile terminal includes: a communication interface unit for transmitting and receiving predetermined data together with a server and for receiving application recommendation information; a control unit for controlling a generation and a display of a user interface including the application recommendation information; an output unit for displaying the user interface including the application recommendation information under control of the control unit, wherein the application recommendation information includes at least one application selected based on time and location information of where a mobile terminal is located and frequency of use of each application, wherein the frequency of use of the application is classified by at least one of a time when each application is executed and a location where each application is executed.

When a predetermined application is executed, the control unit may control transmission of at least one of time information about when the mobile terminal is executing a predetermined application and location information about where the mobile terminal is located and information about the executed predetermined application to the server.

The time and location information may include at least one of time information and location information about where the mobile terminal is currently located when executing a predetermined application in the mobile terminal.

The application recommendation information may include at least one application which corresponds to the time and location information of where the mobile terminal is currently located and wherein the application has a frequency of use that is within a predetermined higher ranking.

The control unit may control a generation of the user interface that includes a menu key capable of immediately executing an application having highest frequency of use from among the at least one application included in the application recommendation information.

The control unit may control a generation of the user interface that includes a list including the at least one application of which the frequency of use is within the predetermined higher ranking.

According to another aspect of an exemplary embodiment, there is provided a communication system including: a server for obtaining frequencies of use of applications that are classified by at least one of a time and a location where each application is executed, for selecting at least one application from among a plurality of applications based on time and location information of where a mobile terminal is located and the frequencies of use of applications, and for transmitting application recommendation information including the selected at least one application to the mobile terminal; and a mobile terminal for displaying a user interface including the application recommendation information transmitted from the server.

BRIEF DESCRIPTION OF THE DRAWINGS

The above and other features and advantages of the inventive concept will become more apparent by describing in detail exemplary embodiments thereof with reference to the attached drawings in which:

FIG. 5 is a table for explaining frequencies of use of applications;

FIG. 6 is a table for explaining frequencies of use of applications;

FIG. 7 is a table for explaining frequencies of use of applications;

DETAILED DESCRIPTION

Applications (APPS) are application programs that are executable in computer apparatuses including mobile terminals and that perform predetermined functions. Recently, as mobile terminals are more widely used, a great number of applications have been released and new applications are being continuously developed.

In order to use a predetermined application, a user accesses a server which provides applications and searches for a desired application through a category search, a keyword search, or the like.

An exemplary embodiment may recommend an application with a high possibility of use by obtaining frequencies of use of applications that are classified according to a current time or a current location of a mobile terminal, selecting at least one predetermined application based on the frequencies of use of applications, and then recommending the selected predetermined application to a user of the mobile terminal. Hereinafter, exemplary embodiments will be described in detail with reference to the accompanying drawings.

Figure 1:
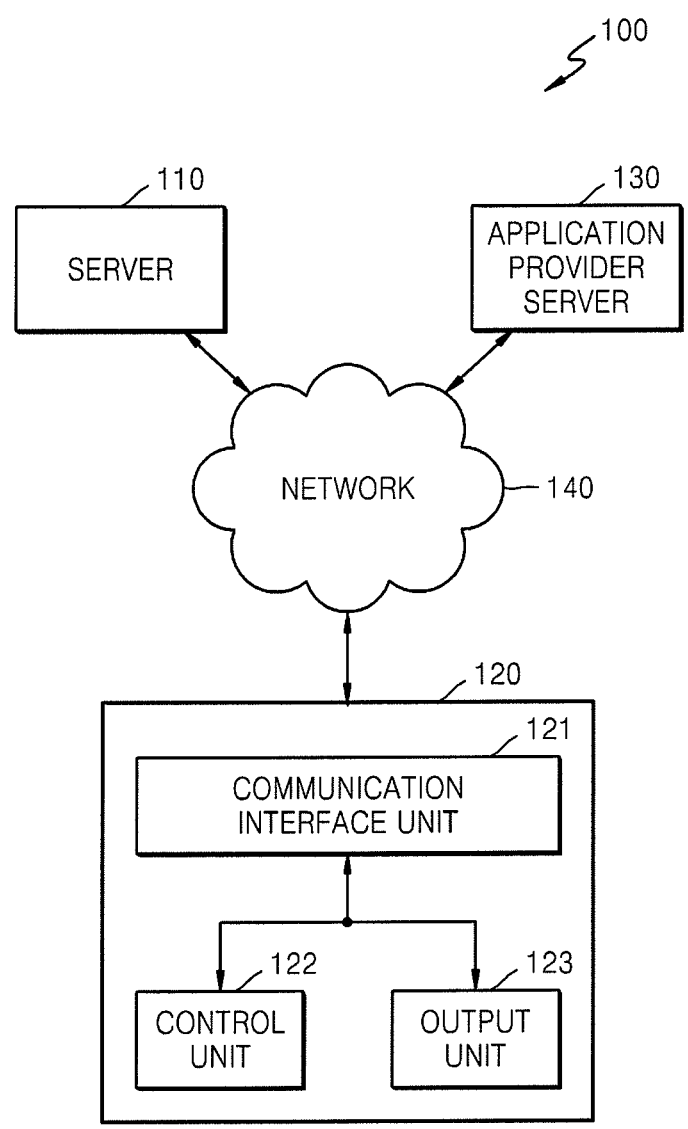
FIG. 1 is a diagram illustrating a mobile terminal and a communication system according to an aspect of an exemplary embodiment.

FIG. 1 is a diagram illustrating a mobile terminal 120 and a communication system 100 according to an aspect of an exemplary embodiment.

Referring to FIG. 1, the mobile terminal 120 includes a communication interface unit 121, a control unit 122, and an output unit 123. The communication system 100 includes a server 110 and the mobile terminal 120. In the communication system 100, a data transmission and reception between the server 110 and the mobile terminal 120 is performed through a network 140.

The server 110 obtains frequencies of use of applications that are classified according to at least one of a time when each application is executed and a location where each application is executed. At least one application from among a plurality of applications is selected based on time and location information of the mobile terminal 120 and the frequency of use of each application. Then, application recommendation information including the selected at least one application is transmitted to the mobile terminal 120. The application recommendation information may include a part of the selected at least one application. The application recommendation information is transmitted through the network 140.

An operation of obtaining the frequency of use of each application and an operation of selecting an application, which are performed in the server 110, are explained with reference to FIGS. 3 and 4 below.

The mobile terminal 120 is an electronic device that may execute an application.

The communication interface unit 121 transmits or receives predetermined data together with the server 110. The communication interface unit 121 receives application recommendation information that is transmitted from the server 110. The number of applications that is included in the application recommendation information may be changed depending on a setting of the server 110 or the mobile terminal 120. For example, the server 110 may select one or N applications itself (here, N is an integer greater than 2). In addition, the mobile terminal 120 may request the server 110 to select one or N applications, and thus, the server 110 may select one or N applications.

In addition, the time and location information includes at least one of time information related to current time and location information about where the mobile terminal 120 is currently located. The frequency of use of each application is explained with reference to FIGS. 5 through 7 below.

The communication interface unit 121 controls the communication between the server 110 or an application provider server 130 and the mobile terminal 120, and may include a communication module (not shown) for connecting the communication interface unit 121 to the network 140 by wires or wirelessly. For example, the communication interface unit 121 may include a communication module for wireless local area network (WLAN) (for example, Wi-Fi), wireless broadband (Wibro), world interoperability for microwave access (Wimax), code division multiple access (CDMA), or wideband code division multiple access (WCDMA).

The control unit 122 controls an overall operation of the mobile terminal 120. In detail, the control unit 122 controls a generation and a display of a user interface including the application recommendation information transmitted from the server 110. The user interface to be output is explained with reference to FIGS. 8 and 9 below.

The output unit 123 displays the user interface including the application recommendation information depending on a control of the control unit 122.

The network 140 may be formed based on one of various communication network standards such as local area network (LAN), wide area network (WAN), WLAN (for example, Wi-Fi), Wibro, CDMA, and WCDMA.

In addition, the communication system 100 may further include the application provider server 130. The application provider server 130 transmits an application program to the mobile terminal 120 through the network 140 depending on a request of the mobile terminal 120.

For example, the mobile terminal 120 receives the application recommendation information from the server 110 and then displays the user interface including the application recommendation information. A user of the mobile terminal 120 may request the mobile terminal 120 to execute any one of the applications included in the application recommendation information. When an application requested by a user is not stored in the mobile terminal 120, the control unit 122 of the mobile terminal 120 may automatically access the application provider server 130, and then may download the requested application to execute it.

Figure 2:
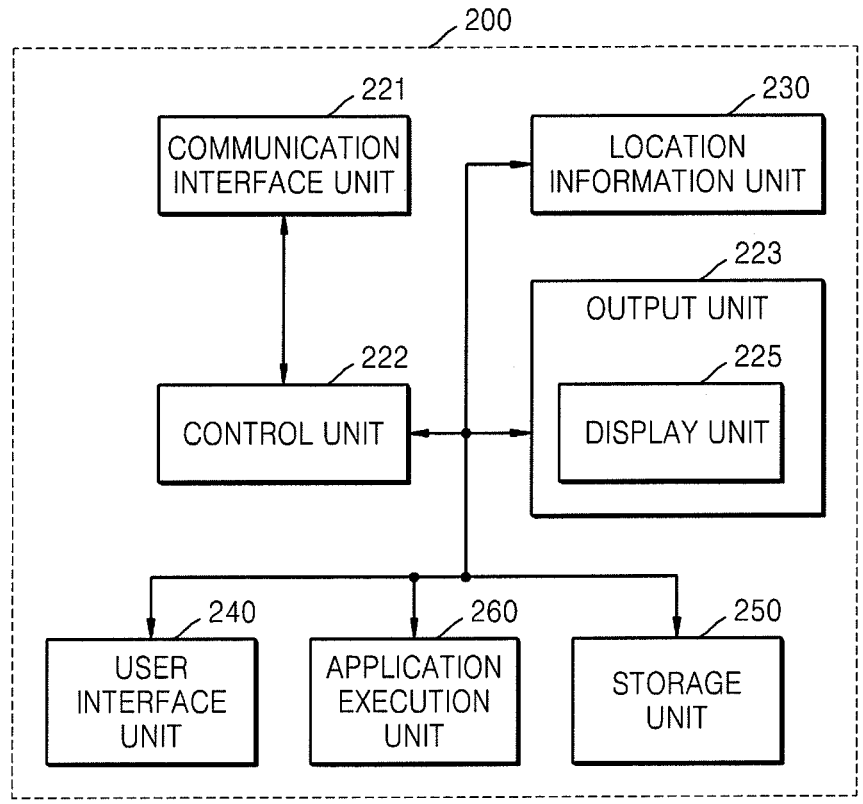
FIG. 2 is a block diagram illustrating a mobile terminal according to another aspect of an exemplary embodiment.

FIG. 2 is a block diagram illustrating a mobile terminal 200 according to another aspect of an exemplary embodiment. The mobile terminal 200, a communication interface unit 221, a control unit 222, and an output unit 223 which are illustrated in FIG. 2 correspond to the mobile terminal 120, the communication interface unit 121, the control unit 122, and the output unit 123 which are illustrated in FIG. 1, respectively. Thus, a repeated description thereof is omitted.

Referring to FIG. 2, the mobile terminal 200 may further include at least one of a location information unit 230, a user interface unit 240, a storage unit 250, and an application execution unit 260, compared to the mobile terminal 120 illustrated in FIG. 1. In addition, the output unit 223 may include a display unit 225.

The location information unit 230 obtains time information and location information about where the mobile terminal 200 is located. In detail, the location information unit 230 may include a global position system (GPS) module (not shown). The GPS module of the location information unit 230 obtains the location information and the time information about a where the mobile terminal 200 is located, by using a satellite, and transmits the information to the control unit 222. The location information unit 230 may obtain the location information and the time information in real time or at predetermined time intervals, or may obtain the location information and the time information only when a predetermined application is executed.

When a predetermined application is executed, the control unit 222 transmits the location information, the time information obtained by the location information unit 230, and information about the executed predetermined application to the server 110 through the communication interface unit 221. The location information and the time information obtained by the location information unit 230 may be used for obtaining the frequency of use of each application through the server 110.

In addition, the control unit 222 may transmit the location information and the time information obtained by the location information unit 230 to the server 110 through the communication interface unit 221 in real time or at predetermined time intervals. That is, the control unit 222 may provide time and location information, which is a basis for selecting an application included in the application recommendation information, to the server 110.

The output unit 223 includes the display unit 225, which displays a user interface.

The user interface unit 240 receives a request or command for controlling an operation of the mobile terminal 200 or other data from a user, and transmits the request, the command, or the other data to the control unit 222. The user interface unit 240 may include a touch pad that is coupled to the display unit 225 or a key pad that includes soft keys or hard keys corresponding to predetermined requests or commands.

For example, when the user interface unit 240 includes a touch pad, the user interface unit 240 outputs a user interface on the display unit 225 coupled to the touch pad. When a user touches a predetermined location on the user interface, the user interface unit 240 senses the touched location and then outputs location information about the touched location to the control unit 222. The control unit 222 receives the location information about the touched location and then recognizes a request or command of a user, and may perform the recognized request or command.

The application execution unit 260 executes a predetermined application depending on a control of the control unit 222.

The storage unit 250 may store programs and data which are processed and operated by the control unit 222. The storage unit 250 may also store applications that may be executed by the mobile terminal 200. In addition, the storage unit 250 may store location information and time information of the mobile terminal 200 obtained by the location information unit 230.

Figure 3:
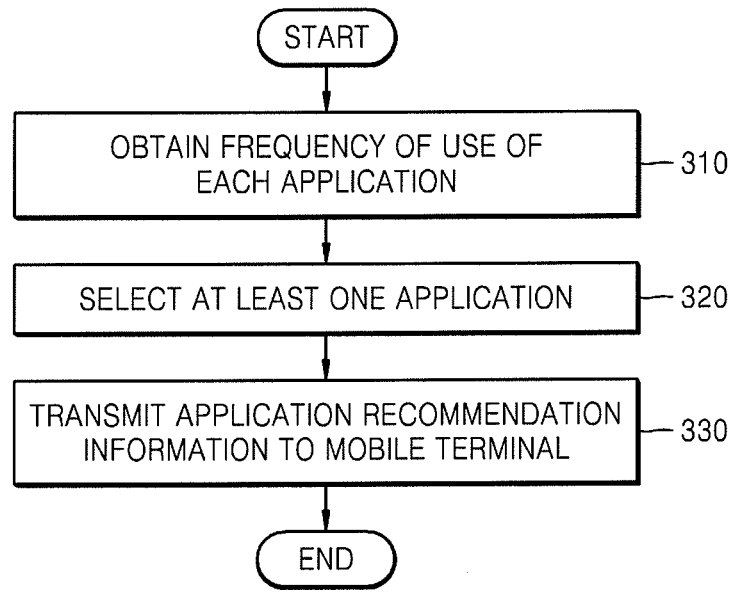
FIG. 3 is a flowchart illustrating a method of recommending an application, according to an aspect of an exemplary embodiment.

FIG. 3 is a flowchart illustrating a method of recommending an application, according to an aspect of an exemplary embodiment. The method of recommending an application may be performed in the communication system 100 of FIG. 1. In detail, each of the operations of the method may be performed in at least one of the server 110, the mobile terminal 120 or 200, and the application provider server 130. Thus, the method of recommending an application is explained as follows with reference to FIGS. 1 through 3.

Referring to FIG. 3, the method includes obtaining frequencies of use of applications that are classified according to at least one of a time when each application is executed and a location where each application is executed (operation 310).

The applications for which a frequency of use is calculated may be executed in the mobile terminal 200. The frequency of use of each application may be obtained by accumulating the number of uses of each application that is executed in mobile terminals included in a predetermined group. In addition, the frequency of use of each application may be obtained by accumulating the number of uses of each application for a predetermined period based on the current date. For example, the predetermined group may include mobile terminals that joined a predetermined communication company, and the predetermined period may be set, for example, to three recent months.

Operation 310 may be performed in the server 110. The server 110 receives application use information from a plurality of mobile terminals of a predetermined group. Whenever each of the mobile terminals of the predetermined group executes a predetermined application, each of the mobile terminals transmits information for identifying the executed predetermined application, for example, a title of the executed predetermined application or a program title corresponding thereto to the server 110. The server 110 receives the information for identifying the executed predetermined application and then obtains the frequency of use of each application.

In detail, the frequencies of use of applications may be classified according to time information and location information about where the mobile terminal 120 is located when the mobile terminal 120 executes the predetermined application. The time information may include at least one of season information, month information, day information, and hour information, and the location information may include at least one of address information, coordinate information, landmark information, neighborhood information, and location information of where the mobile device 120 is located.

Based on the time and location information of the mobile terminal 120 and the frequency of use obtained in operation 310, at least one of a plurality of applications is selected (operation 320). The time and location information may include at least one of the time information and the location information about where the mobile terminal 120 is currently located. Operation 320 may be performed in the server 110.

In detail, the server 110 lines up the frequencies of use of the plurality of applications obtained in operation 310 in descending order or ascending order, and selects a plurality of applications in order of high frequency of use. For example, the server 110 may select five applications in order of high frequency of use.

The server 110 transmits an application recommendation information including the at least one of the plurality of applications selected in operation 320 to the mobile terminal 120 (operation 330). The transmission of operation 330 may be performed through the network 140. The mobile terminal 120 or 200 receives the application recommendation information, which is transmitted from the server 110 in operation 330, through the communication interface unit 121 or 221.

Figure 4:
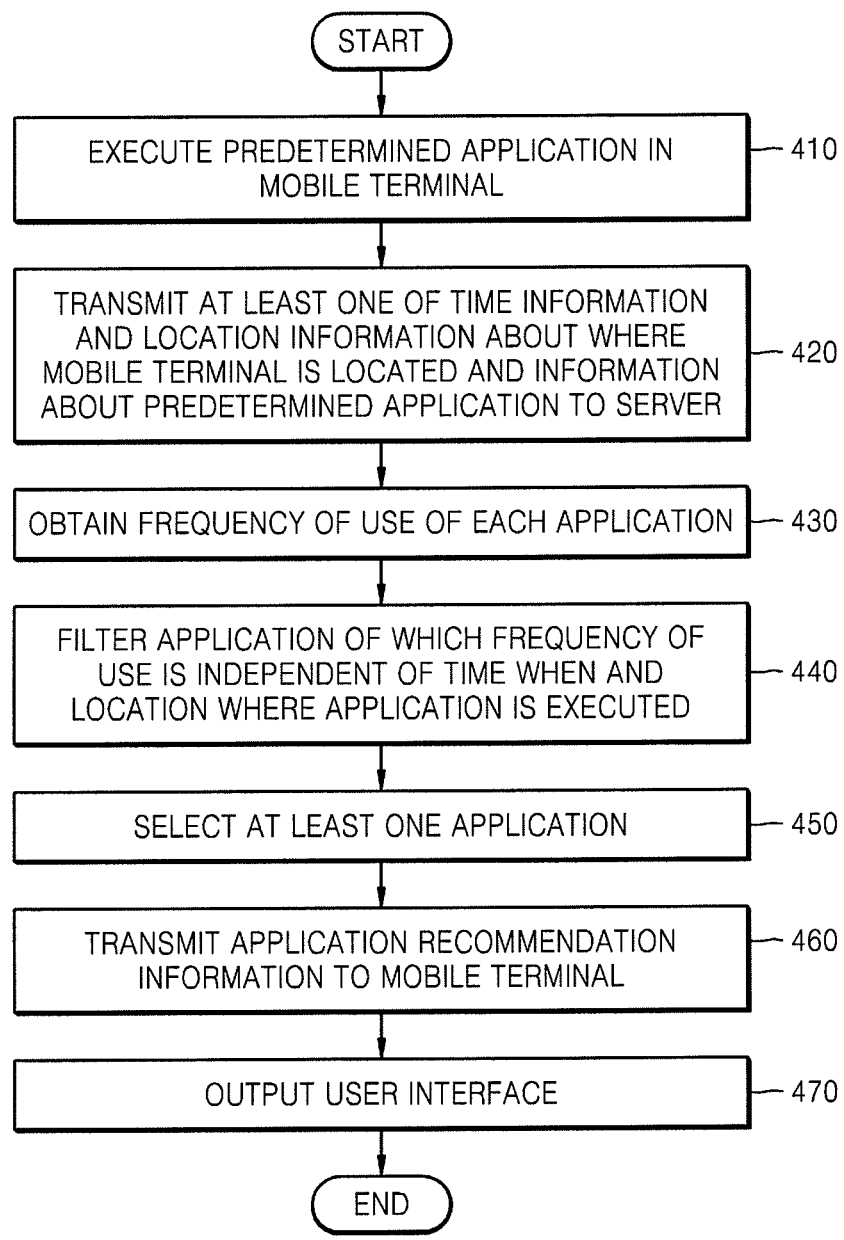
FIG. 4 is a flowchart illustrating a method of recommending an application, according to another aspect of an exemplary embodiment.

FIG. 4 is a flowchart illustrating a method of recommending an application, according to another aspect of an exemplary embodiment. Because operations 430, 450, and 460 of FIG. 4 identically correspond to operations 310, 320, and 330 of FIG. 3, respectively, a repeated detailed description thereof is omitted. The application recommendation method of FIG. 4 further includes at least one of operations 410, 420, 440, and 470, compared to the application recommendation method of FIG. 3.

Referring to FIG. 4, the application recommendation method of FIG. 4 includes executing a predetermined application in the mobile terminal 200 (operation 410). Operation 410 may be executed by the application execution unit 260 under control of the control unit 222.

When executing the predetermined application in the mobile terminal 200, at least one of time information and location information about where the mobile terminal 200 is located and information about the executed predetermined application are transmitted to the server 110 (operation 420).

In detail, the control unit 222 of the mobile terminal 200 executes a predetermined application according to a request of a user, and requests the location information unit 230 to transmit the location information and the time information of the mobile terminal 200. The location information unit 230 obtains the location information and the time information of the mobile terminal 200, and transmits the information to the control unit 222. The control unit 222 transmits at least one of the location information, the time information of the mobile terminal 200 received from the location information unit 230, and the information about the executed predetermined application continuously to the server 110. The information about the executed predetermined application may include an application title, an application program name, or other identification marks, which may name or identify the executed predetermined application.

In operation 430, frequencies of use of applications that are classified according to at least one of a time when an application is used and a location where each application is executed are obtained. Operation 430 may be performed in the server 110. The frequency of use of each application that is obtained in operation 430 is explained in detail with reference to FIGS. 5 through 7 as follows.

FIG. 5 is a table 500 for explaining frequency of use of each application.

Referring to FIG. 5, the server 110 may obtain the frequency of use of each application according to a time when an application is executed by the mobile terminal 200. In detail, the frequency of use may be classified by at least one of season, month, day of the week, and hour. FIG. 5 illustrates a case in which the frequency of use of each application is obtained according to day of the week and hour 510 when each application is executed, as an example. Applications App. 1 and App. 2 520 of which frequencies of use are calculated may become applications that may be executed in the mobile terminal 200.

FIG. 6 is a table 600 for explaining frequency of use of each application.

Referring to FIG. 6, the server 110 may obtain frequency of use of each of the applications, App. 1 and App. 2, 620 according to information about a location where each application is executed by the mobile terminal 200. The frequency of use of each application may be obtained by identifying it by locations 610 where the mobile terminal 200 is located when the mobile terminal 200 executes each application.

FIG. 7 is a table 700 for explaining frequency of use of each application.

Referring to FIG. 7, the server 110 may obtain frequency of use of each of the applications, App. 1, App. 2, and App. 3 720, according to a time when and a location where each application is executed by the mobile terminal 200. In detail, the frequency of use by each application may be identified by at least one of season, month, day of the week, and hour, and locations. FIG. 7 illustrates a case in which the frequency of use of each of the applications is obtained by identifying it by location, day of the week, and hour, as an example.

The server 110 may store the frequency of use of each application in the tables 500, 600, and 700 of a predetermined storage space (not shown) of the server 110.

The application recommendation method of FIG. 4 according to another aspect of an exemplary embodiment may further include filtering an application of which frequency of use is independent of a time when and a location where the application is executed (operation 440). That is, when frequency of use of an application is constant regardless of a time when the application is executed and a location where the application is executed, this application is excluded from selectable applications in operation 450.

With respect to values of frequency of use according to times and locations of an application, when a ratio of a difference between a maximum value of frequency of use and a minimum value of frequency of use to the maximum value of frequency of use is in a predetermined range, this application is filtered. The predetermined range may be set, for example, as 10 percent (%) of the maximum value of frequency of use. In addition, the predetermined range may be set to have a predetermined value according to a maker of the mobile terminal 200, a provider of the server 110, a user of the mobile terminal 200, or a self-setting of the mobile terminal 100 or the server 110.

Referring to FIG. 7, the frequency of use of the application App. 3 hardly varies according to locations that indicate locations and day of the week and hour that indicate times. In detail, a maximum value of frequency of use of the application App. 3 is 214, a minimum value of frequency of use of the application App. 3 is 200, and a ratio of a difference (214−200=14) between the maximum value of frequency of use and the minimum value of frequency of use to the maximum value of frequency of use is 6.543% (14/214). Thus, the server 100 may filter the application App. 3 and exclude it from the selectable application in operation 450. For example, since frequency of use of a telephone call application or a text message transmission application does not vary independent of a time when and a location where it is executed, this application may be filtered.

Based on the time and location information of where the mobile terminal 200 is located and the frequency of use by each application obtained in operation 430, at least one of a plurality of applications which the mobile terminal 200 may execute is selected (operation 450). At least one application which corresponds to information about current time and location of the mobile terminal 200 and of which frequency of use is within a predetermined higher ranking is selected. As stated above, an application filtered in operation 440 may be excluded from the selectable application in the application selection operation 450. Operation 450 may be executed in the server 110.

Operation 450 may further include lining up the applications in order of highest frequency of use obtained in operation 430. At least one application of which frequency of use is within a predetermined high ranking may be selected.

In operation 450, the time and location information of the mobile terminal 200 includes at least one of current location information and current time information of the mobile terminal 200. The time and location information may be updated at every predetermined time interval. In addition, the time and location information of the mobile terminal 200 may be calculated at predetermined time intervals in the location information unit 230 of the mobile terminal 200, and may be transmitted to the server 110.

Referring to FIG. 7, when information about current time and location of the mobile terminal 200 includes "Location 1", "Sunday", and "Eighteen o'clock", the application App. 2 corresponding to "Location 1", "Sunday", and "Eighteen o'clock" and having highest frequency of use is selected. The application App. 3 filtered in operation 440 is excluded from the selectable application of operation 450.

Application recommendation information selected in operation 450 is continuously transmitted from the server 110 to the mobile terminal 200 (operation 460). The mobile terminal 200 receives the application recommendation information, and generates and outputs a user interface including the application recommendation information (operation 470).

The communication interface unit 221 receives the application recommendation information and transmits it to the control unit 222. The user interface unit 240 generates the user interface including the application recommendation information depending on a control of the control unit 222. The display unit 225 displays the user interface generated in the user interface unit 240.

Figure 8:
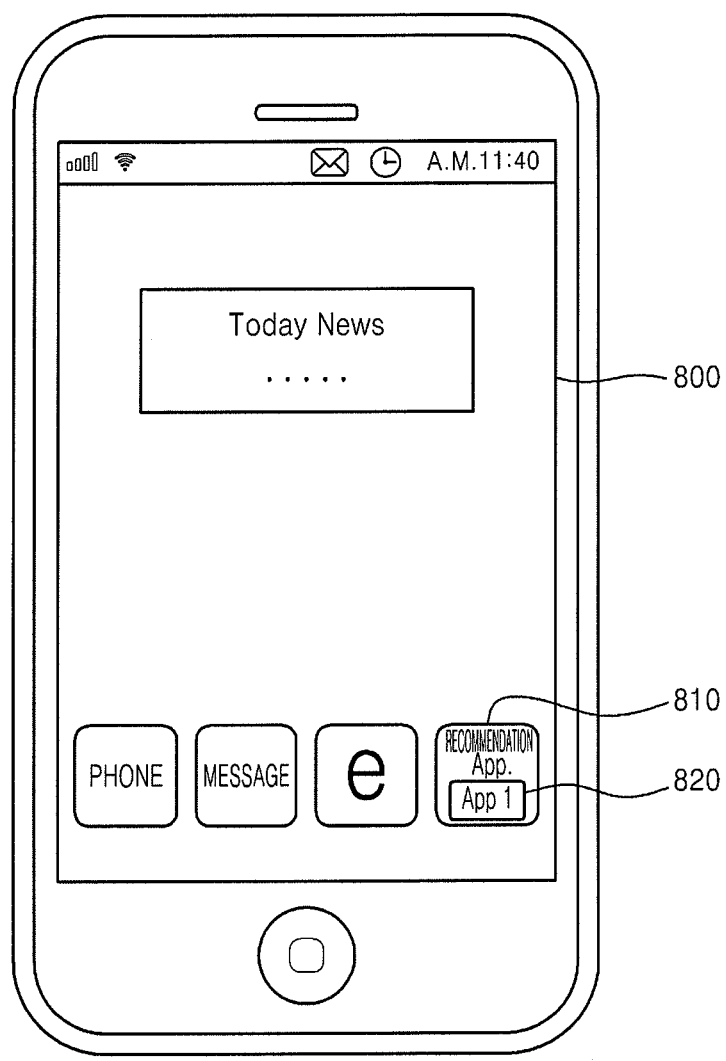
FIG. 8 is a schematic diagram of a user interface which a mobile terminal displays.

FIG. 8 is a schematic diagram of a user interface 800 which a mobile terminal displays.

Referring to FIG. 8, the user interface 800 that is displayed in operation 470 may include the application recommendation information. In detail, the mobile terminal 200 may indicate a selected application on a predetermined area 820.

Figure 9:
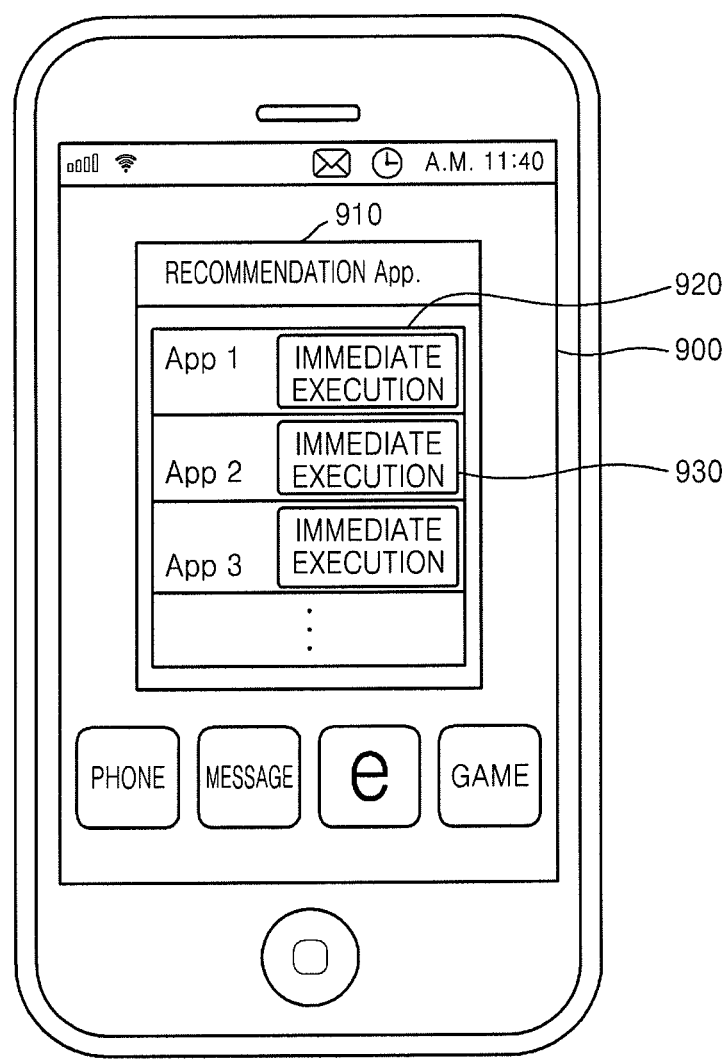
FIG. 9 is a schematic diagram of a user interface which a mobile terminal displays.

FIGS. 8 and 9 illustrate a case in which the user interface unit 240 includes a touch pad coupled to the display unit 225, as an example.

For example, when a user touches an area 810 on which the application recommendation information of the user interface 800 is displayed, the control unit 222 may control the application execution unit 260 to immediately execute the selected application App. 2. Thus, the application execution unit 260 executes the application App. 2.

FIG. 9 is a schematic diagram of a user interface 900 which a mobile terminal displays.

Referring to FIG. 9, the user interface 900 that is displayed in operation 470 may include pop up window type application recommendation information 910. In addition, when the mobile terminal 200 displays the user interface 800 illustrated in FIG. 8 and a user touches the area 810 on which the application recommendation information of the user interface 800 is displayed, the mobile terminal 200 may display the pop up window type application recommendation information 910 illustrated in FIG. 9.

The pop up window type application recommendation information 910 may include a list 920 in which a predetermined number of applications are arranged in order of highest frequency of use. In addition, the pop up window type application recommendation information 910 may include an immediate execution key 930 that is a menu key capable of immediately executing a selected application. When a user touches the immediate execution key 930, the control unit 222 may control the application execution unit 260 to immediately execute a selected application. Thus, the application execution unit 260 executes the selected application.

The application recommendation method according to an aspect of an exemplary embodiment, the mobile terminal using the method, and the communication system using the method may recommend to the user an application of which frequency of use is highest at a time and a location where a user is located, by selecting an application corresponding to a current time and location information of where the mobile terminal 200 is located and having high frequency of use and then recommending the selected application to the user.

Thus, the user may minimize a time that is required to search for applications, and may rapidly and conveniently access and use the applications.

For example, if the mobile terminal is located in a train station and an application that is used most in the mobile station is an application informing users of operation times of trains, the application recommendation method according to an aspect of an exemplary embodiment, the mobile terminal using the method, and the communication system using the method recommend an application informing passengers of operation times of trains to a user.

As another example, when the mobile terminal is at any place at six o'clock on Saturday evening and an application that is used most in that place at six o'clock on Saturday evening is an application informing about best restaurants around, the mobile terminal using the method, and the communication system using the method recommend an application which provides information about the best restaurants around a user.

Thus, the application recommendation method, the mobile terminal using the method, and the communication system using the method may recommend an application coinciding with a possibility that a user will use the application or an intention of a user.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. Accordingly, exemplary embodiments should be considered in an illustrative sense rather than a limiting sense. The scope of the present invention is defined not by the detailed description, but by the appended claims, and all differences within the scope will be construed as being included in the present invention.

What is claimed is:

1. A method of recommending an application, the method comprising:
   obtaining, in a server, frequencies of use of a plurality of applications by classifying and accumulating a number of uses of each application that is executed in a plurality of mobile terminals according to a time when each application is executed in each mobile terminal and a location where each mobile terminal executing each application is located;
   filtering at least one first application which has the frequency of use that is in a predetermined frequency of use range, regardless of the time when the application is executed and the location where the application is executed;
   selecting at least one second application from among the plurality of applications excluding the filtered at least one first application based on time and location information of a first mobile terminal and the frequency of use of the application; and
   transmitting application recommendation information including the selected at least one second application that are executable in the first mobile terminal from the server to the first mobile terminal,
   wherein the selecting of the at least one second application comprises:
      ranking the plurality of applications excluding the filtered at least one first application in order from highest to lowest frequency of use; and
      selecting the at least one second application which corresponds to the time and location information of the first mobile terminal and which has a frequency of use that is within a predetermined ranking of the ranked plurality of applications.

2. The method of claim 1, wherein the time and location information comprises at least one from among time information and location information about where the first mobile terminal is currently located.

3. The method of claim 1, wherein the obtaining of the frequencies of use comprises obtaining the frequency of use of each of the plurality of applications executable by the first mobile terminal.

4. The method of claim 1, further comprising, when executing a predetermined application in the first mobile terminal, transmitting at least one from among time and location information about the first mobile terminal is located and information about the executed predetermined application to the server.

5. The method of claim 1, wherein the obtaining of the frequencies of use comprises obtaining a frequency of use of each of the plurality applications, wherein the frequency of use of each application is classified according to at least one from among season, month, day of the week, and hour when each application is executed.

6. The method of claim 1, wherein the obtaining of the frequencies of use comprises obtaining a frequency of use of each of the plurality applications that is classified according to a location of the first mobile terminal which executes the application.

7. The method of claim 1, further comprising displaying a user interface including the application recommendation information on the first mobile terminal.

8. The method of claim 1, wherein the selecting of the at least one second application comprises selecting at least one second application based on the time and location information and the frequency of use of each application corresponding to a predetermined period.

9. A mobile terminal comprising:
   a communication interface unit which transmits and receives predetermined data with a server and receives application recommendation information from the server;
   a control unit which controls the mobile terminal to generate and display of a user interface including the application recommendation information; and
   an output unit which displays the user interface including the application recommendation information under the control of the control unit,
   wherein the application recommendation information comprises at least one second application selected that are executable in a first mobile terminal based on time and location information of the mobile terminal and a frequency of use of a plurality of applications,
   wherein the application recommendation information is obtained by classifying and accumulating a number of uses of each application that is executed in a plurality of mobile terminals according to a time when each application is executed and a location where each mobile terminal executing each application is located, filtering at least one first application which has the frequency of use that is in a predetermined frequency of use range, regardless of the time when the at least one first application is executed and the location where the at least one first application is executed, and selecting the at least one second application from among the plurality of applications excluding the filtered at least one first application based on time and location information of a first mobile terminal and the frequency of use of the application, and
   wherein the at least one second application corresponds to the time and location information of where the mobile terminal is currently located, and
   wherein the application has a frequency of use that is within a predetermined ranking.

10. The mobile terminal of claim 9, wherein, when a predetermined application is executed, the control unit controls transmission of time information and location information about the mobile terminal or information about the executed predetermined application to the server.

11. The mobile terminal of claim 9, wherein the time and location information comprises time information about when the mobile terminal is executing a predetermined application and location information about where the mobile terminal is currently located when executing the predetermined application in the mobile terminal.

12. The mobile terminal of claim 9, wherein the control unit controls the mobile terminal to generate the user interface that includes a menu key capable of immediately executing the at least one second application included in the application recommendation information.

13. The mobile terminal of claim 9, wherein the control unit controls the mobile terminal to generate the user interface that includes a list including the at least one second application which has a frequency of use that is within the predetermined ranking.

14. A communication system comprising:
a server which obtains frequencies of use of a plurality of applications by classifying and accumulating a number of uses of each application that is executed in a plurality of mobile terminals according to a time when each application is executed and a location where each mobile terminal executing each application is located, filters at least one first application which has the frequency of use that is in a predetermined frequency of use range, regardless of the time when the application is executed and the location where the application is executed, selects at least one second application from among the plurality of applications excluding the filtered at least one first application based on time and location information of where a first mobile terminal is located and the frequencies of use of applications, and transmits application recommendation information including the selected at least one second application that are executable in the first mobile terminal to the first mobile terminal; and
the first mobile terminal which displays a user interface including the application recommendation information transmitted from the server,
wherein the server selects of the at least one second application by:
ranking the plurality of applications excluding the filtered at least one first application in order from highest to lowest frequency of use; and
selecting the at least one second application which corresponds to the time and location information of the first mobile terminal and which has a frequency of use that is within a predetermined ranking of the ranked plurality of applications.

15. A method of recommending an application, the method comprising:
obtaining application recommendation information comprising at least one second application that is executable in the first mobile terminal corresponding to a location and time of use of a first mobile terminal from a server; and
displaying application recommendation information on the first mobile terminal,
wherein the application recommendation information is based upon frequencies of use of a plurality of applications,
wherein the application recommendation information is obtained by classifying and accumulating a number of uses of each application that is executed in a plurality of mobile terminals according to a time when each application is executed and a location where each mobile terminal executing each application is located, filtering at least one first application which has the frequency of use that is in a predetermined frequency of use range, regardless of the time when the application is executed and the location where the application is executed, and selecting the at least one second application from among the plurality of applications excluding the filtered at least one first application based on time and location information of a first mobile terminal and the frequency of use of the application, and
wherein the selecting of the at least one second application comprises:
ranking the plurality of applications excluding the filtered at least one first application in order from highest to lowest frequency of use; and
selecting the at least one second application which corresponds to the time and location information of the first mobile terminal and which has a frequency of use that is within a predetermined ranking of the ranked plurality of applications.

\* \* \* \* \*